United States Patent
Moritomo

[11] 3,964,210
[45] June 22, 1976

[54] GRINDING APPARATUS
[75] Inventor: Sadao Moritomo, Ichikawa, Japan
[73] Assignee: Seiko Seiki Kabushiki Kaisha, Japan
[22] Filed: Sept. 27, 1974
[21] Appl. No.: 509,851

[30] Foreign Application Priority Data
Oct. 1, 1973 Japan.............................. 48-110371

[52] U.S. Cl........................... 51/165.71; 51/165.77; 51/165.91
[51] Int. Cl.² .......................................... B24B 49/04
[58] Field of Search......... 51/165 R, 165.71, 165.77, 51/165.83, 165.91

[56] References Cited
UNITED STATES PATENTS

| | | | |
|---|---|---|---|
| 3,622,287 | 11/1971 | Kurimoto.......................... | 51/165 R |
| 3,653,855 | 4/1972 | Smith................................ | 51/165.77 |
| 3,691,357 | 9/1972 | McIntosh...................... | 51/165.71 X |
| 3,699,720 | 10/1972 | Lenning........................... | 51/165.77 |
| 3,828,439 | 8/1974 | Ishikawa........................ | 51/165.83 |
| 3,842,595 | 10/1974 | Possati............................. | 51/165.91 |
| 3,846,689 | 11/1974 | Possati............................. | 51/165.91 |

*Primary Examiner*—Harold D. Whitehead
*Attorney, Agent, or Firm*—Robert E. Burns; Emmanuel J. Lobato; Bruce L. Adams

[57] ABSTRACT

A grinding apparatus has an in-process sizing device to measure a size of a workpiece under grinding, and a detecting device to measure the location of the infeed table on which a grinding wheel is mounted to grind the workpiece. The outputs of the in-process sizing device and of the detecting device are so calculated that the amount of residual stock-removal on the workpiece is computed out as the difference between infeed amount of the wheel head and actual stock-removal amount on the workpiece which is continuously measured by the in-process sizing device. The computed residual stock-removal is compared with a pre-set value which is selected from a series of pre-set values for various grinding steps such as a rough grinding step or a fine grinding step, in response to the workpiece size measured by the in-process sizing device. In-feed speed of the infeed table to the workpiece is so controlled by the output of a comparator which executes the above comparing process that the output value is intended to become zero.

4 Claims, 3 Drawing Figures

GRINDING APPARATUS

BRIEF SUMMARY OF THE INVENTION

The present invention relates to a grinding machine, and more particularly to a grinding apparatus for an internal and cylindrical grinding machines wherein this apparatus is adapted to control infeed speed of an infeed table in such manner that reductive rate of workpieces maintains a previously set infeed during the grinding operation.

In conventional type grinding machines, an infeed table is imparted feed motion or operation as a function of a predetermined workpiece size to be ground and spark-out grinding is carried out. And the infeed table is kept at a final feeding position for a desired time. However, the movements of the infeed table according to conventional apparatus differ from reduction of workpieces ground by a grinding wheel, as shown in FIG. 1(1,2). This results from a deflection of the workpiece and a center which supports it and further the grinding wheel arbor deflects and accordingly results in deviation from a formal position thereof. In this case, even if the infeed table is effected feed motion along the curve 1 as shown in FIG. 1, a reductive rate of the workpiece can not follow the curve 1, so that residual stock G is produced on the workpiece in comparison with the infeed operation of the infeed table. This residual stock G, however, when the infeed table moves up to the spark-out grinding operation, is ground gradually with the aid of a restoring force of the grinding wheel arbor itself. As a result, curve 2 showing reduction of the workpiece moves up to the final infeed position in the curve 1 of the infeed table and accordingly the workpiece are ground at a predetermined size. In the grinding apparatus depending on such a mechanically operated device or method, it takes not so much time to grind the workpiece in case of the use of a grinding wheel with good quality. When, however, loading occurs on the grinding wheel surface, this results in degradation of the grinding quality. In consequence thereof, curve 2 showing reduction in size of the workpiece become as curves 2' and 2'' shown in FIG. 1. And also this results in much residual stock on the workpiece, so that much time is required in the spark-out grinding operation. Moreover, this seriously affects the grinding efficiency and size accuracy of the workpiece.

The present invention is intended to overcome such disadvantages or drawbacks.

It is an object of the present invention to provide a grinding apparatus wherein relative difference between infeed of an infeed table and residual stock of workpieces are previously set severally at every workpiece size to be ground.

In this respect, the controlling of infeed speed of the infeed table allows the grinding wheel to carry out a grinding operation suitable for cutting or grinding quality thereof in such a manner that said difference is held equally to the previously set value or point of workpiece size. This brings about an excellent grinding quality on the workpiece and can increase significantly the grinding efficiency.

DETAILED DESCRIPTION OF THE INVENTION

Figure 3:
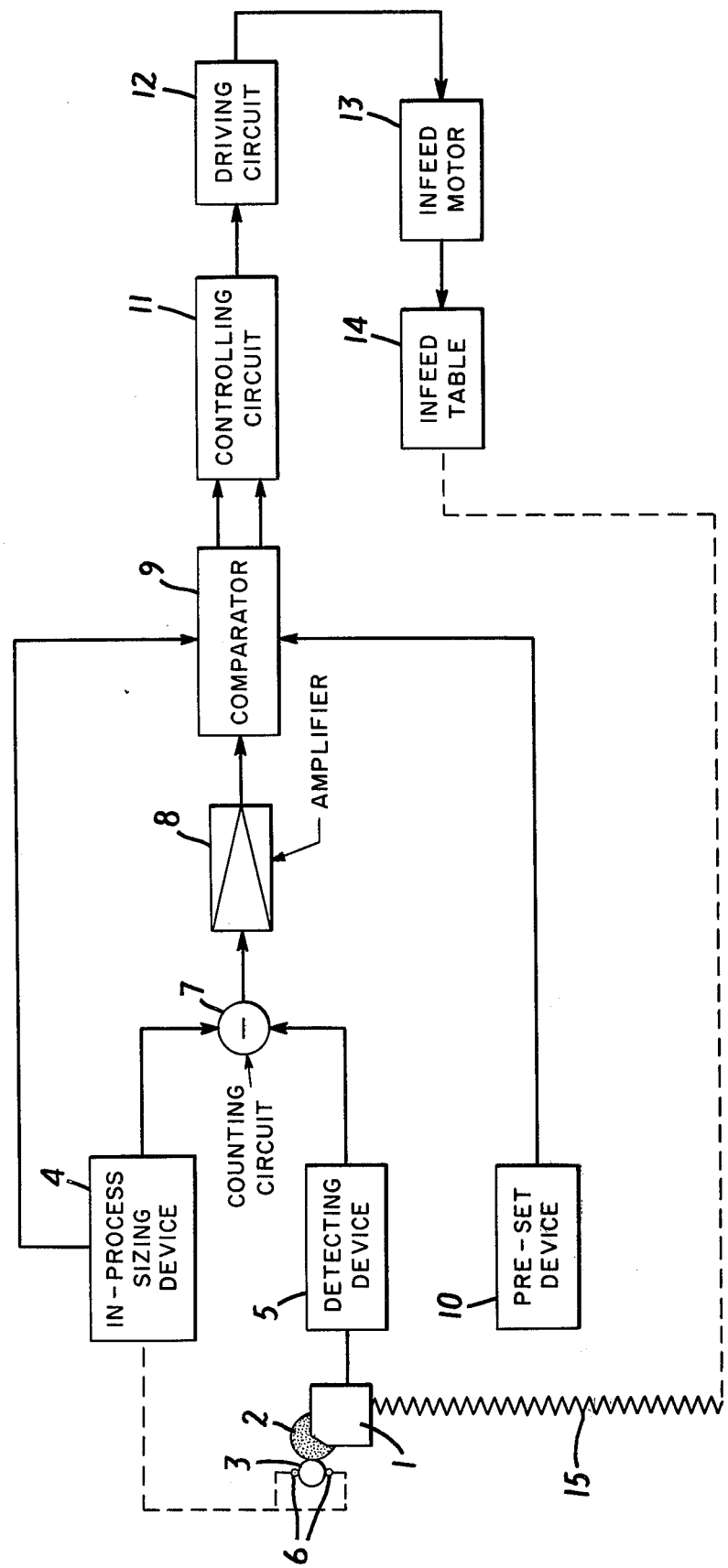
FIG. 3 is a block diagram of a grinding apparatus according to the presentation.

An embodiment of the present invention will be described in conjunction with the accompanying drawings. In FIG. 3 there is shown a block diagram indicating a grinding apparatus.

Reference numeral 1 is a grinding wheelhead on which is mounted a grinding wheel 2 driven by a motor. A workpiece 3 is adapted to be sized in its outer periphery size in such a way that sizing terminals 6 in an in-process sizing device 4, such as a differential transforming, are contacted with the workpiece periphery, thereby obtaining an outer size of the ground workpiece as an analogue signal. Element 5 is a detecting device for detecting infeed movements of the wheelhead 1 on which is mounted the wheel 2.

An output signal from the device 5 and a signal from the in-process sizing device or size-sensing 4 are applied to a counting circuit 7 for counting the reductive rate of the workpiece, as a result, a deviation signal of the two signals is introduced into a discriminating circuit or comparator 9 with the through an amplifier 8. In this discriminating circuit or comparator 9 are introduced the signals representing the outer size of the workpiece from the in-process sizing device 4 and further an output signal from a pre-set device 10. This pre-set device 10 is for setting previously an output level from the device 4, corresponding to the residual stock and workpiece size. The comparator 9 discriminates whether deviation arises from the output signal from the in-process sizing device 4 and amplifier 8 in comparison with the output signal of the pre-set device and the differential or difference signal output of the comparator controls the motor-driving circuit 12 so that the infeed motor 13 is driven and the infeed table 14 carries out the infeed operation.

In the operation of this infeed table 14, the infeed speed thereof is replaced by V1 after the previously set value Go becomes equal to the residual stock G. The grinding operation proceeds so as to keep residual stock Go from infeed P1 to P2 in FIG. 2 and the output signal from the in-process sizing device 4 is introduced to the counting circuit 7 for counting the reductive rate of the ground workpiece. In addition, an output signal representative of the infeed table movements from a detecting device 5 is also introduced to the counting circuit 7.

Thus, the counting circuit 7 counts the differential value between the above mentioned two signals, as a result, the differential signal is introduced to the comparator 9 through the amplifier 8 until such difference signals correspond to residual Go.

The grinding proceeds with the infeed from P1 to P2, thus, until the previously set residual stock Go therebetween becomes equal to the above mentioned difference signal, the output signal from the comparator 9 is introduced to the driving circuit 12 through the controlling circuit 11, thereby controlling and driving the infeed table 14.

The infeed table is controlled for maintaining the infeed speed thereof at V1 so as to keep the previously set residual stock Go. Simultaneously, when an outer workpiece size at infeed P2 is sized by the in-process sizing device 4, the output of which is introduced to the comparator 9. This output applied to the comparator 9 is discriminated with the output signal from the pre-setting device 10, so that the controlling circuit 11 for the infeed motor is driven until the two signals become equal and accordingly the infeed motor-driving circuit 12 is driven with the infeed motor 13. In this respect, the infeed speed of the infeed table is changed at V2. At the same time the comparator 9 is adapted to be controlled until residual stock G2 which is previously pre-set by the pre-setting circuit 10 becomes equal to the two output signals from the in-process sizing device 4 and the detecting circuit 5 while simultaneously the infeed table 14 is controlled in the same manner that the infeed speed thereof is controlled so as to keep the residual stock at G2 until infeed P3 is detected. Thus, the infeed table speed is controlled so as to maintain the residual stock G2, G3 which correspond to infeed points P2 and P3.

When, therefore, a predetermined time elapses, after the infeed Pn is detected, the grinding operation is finished. It is to be noted that workpiece movements allow infeed table speed to be controlled, that is, infeed speed of the grinding wheel or workpiece from the pre-set device 10. The output signals are applied to a controlling circuit 11 for controlling an infeed motor so that such deviation becomes or reduces to zero (0). An output signal from the controlling circuit 11 is introduced to a driving circuit 12 for driving the infeed motor, and then the infeed motor 13 is driven by the output from the circuit 12 with an infeed table 14 driving, thereby controlling it at a predetermined speed. In this respect, a feed-screw 15 is connected between the infeed motor and the infeed table 14.

Figure 1:
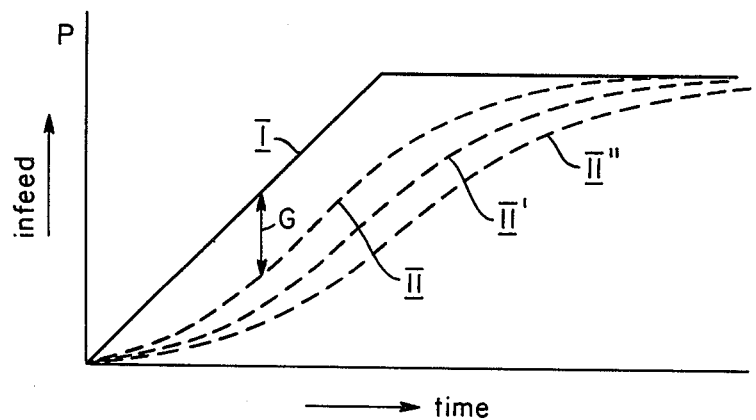
FIG. 1 is a graph showing the relationship between infeed and working time according to conventional art.
Figure 2:
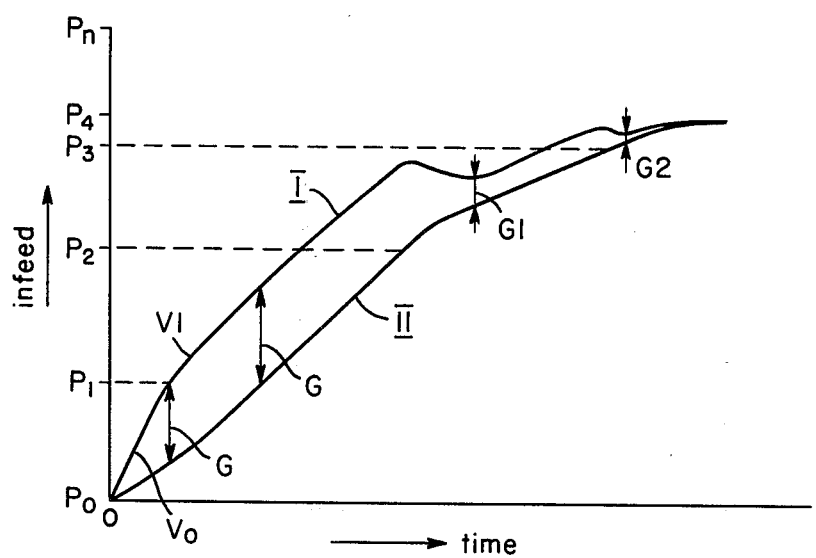
FIG. 2 is a graph showing the same relationship between infeed and working time of the present invention.

The operation of the grinding apparatus according to the invention will be described in conjunction with the drawings, particularly FIG. 2.

Infeed points Po–Pn are previously decided or set by a pre-setting device 10 prior to a grinding operation of every workpiece with simultaneously the residual stock Go–Gn of the workpieces to be ground is set corresponding to the infeed Po–Pn effected settings.

This residual stock Go–Gn is represented as a difference value curve 1 and curve 2 (curve 1 showing infeed of the infeed table, curve 2 showing the outer size of the workpiece sized by the inprocess sizing device 4).

These set values P and G are introduced to the comparator 9. After presetting operation, the infeed table 14 is driven in such a manner that infeed speed thereof is previously set at a maximum speed while the infeed proceeds from Po to Pi.

In accordance with the proceeding of the grinding operation, to the comparator 9 is introduced residual stock G1, which is the difference between the infeed detected by the device 5 and stock removal of the ground workpiece detected by the in-process sizing device 4.

A desired residual stock Go is set in the pre-setting device 10 and the infeed table 14 continuously carries out infeed operation at an infeed speed of Vo until the residual stock Go set by pre-setting device 10 becomes equal to residual stock of the actually ground workpiece. In this case, the comparator 9 is adapted to discriminates whether the above mentioned values Go and G coincide. As a result, when both values become equal, an output signal from the comparator 9 is introduced to a controlling circuit 11 for controlling the infeed motor 13 whereby the infeed motor is previously compared with the residual stock of the ground workpiece and accordingly such a difference maintains a previously set value.

This residual stock of workpieces is often termed accumulation, which results from the following phenomena; the grinding wheel wear, elastic deformation of workpiece and wheel. That is, this results from principally from the mechanism for workpiece and its support means.

As mentioned above, the relative difference between infeed of the infeed table and residual stock of the workpiece is previously set severally at every workpiece size to be ground. Infeed speed of the infeed table is controlled so as to keep such a difference constant in the set intervals.

Therefore, the grinding apparatus according to the present invention permits the grinding wheel to increase the grinding or cutting quality and also excellently affects the grinding efficiency during the operation. Moreover, the present invention provides many advantages as follows: the controlling of amount of accumulation (residual stock removal) in the finish grinding steps permits the workpiece to decrease the grinding layer thereon, that is to say, a small depth of residual stress is obtained; cylindricity, size accuracy and surface finish of the workpiece is greatly improved compared with conventional grinding apparatus adopted therein feed rate grinding; and further many grinding operation are allowed for one dressing.

What is claimed is:

1. A grinding apparatus comprising, presetting means to preset a reference signal having a value varying in time and corresponding to a desired size of a workpiece at points in time as the workpiece is ground, size-sensing means for sensing the varying size of the workpiece and developing an output signal having values corresponding to the varying size of the workpiece being ground, infeed means for infeeding a grinder to said workpiece for grinding thereof, detecting means for detecting the infeed of the infeed means to said workpiece and developing an output signal representative of the infeed speed of the grinder to the workpiece, a reduction rate-determining circuit receptive of the output signal of the size-sensing means and the output signal of the detecting means for developing a deviation signal representative of the reduction rate of the workpiece while being ground, a comparator circuit receptive of the preset reference signal, the deviation signal and the output signal of said size-sensing means for developing a difference signal when a difference obtained between the deviation signal representative of the reduction rate and the reference signal, and means comprising a control circuit for controlling the rate of feeding of the infeed means to maintain the deviation signal corresponding to a reduction rate signal equal to the reference signal, thereby to control the grinding of the workpiece to maintain the desired infeed speed of said infeed means.

2. A grinding apparatus according to claim 1, in which said reduction rate-determining circuit comprises a counting circuit.

3. A grinding apparatus according to claim 1, in which said infeed means comprises an infeed table, and in which said infeed means comprises an infeed motor for driving said infeed table, and a motor-driving circuit under the control of said control circuit.

4. A grinding apparatus according to claim 1, in which said presetting means comprises means to preset a reference signal corresponding to a relative difference between the infeed speed of said infeed means and residual stock of the workpiece.

* * * * *